(12) United States Patent
Shimizu

(10) Patent No.: US 11,349,811 B2
(45) Date of Patent: May 31, 2022

(54) SECURE CLOUD THAT DOES NOT PLACE CONFIDENTIAL DATA ON THE INTERNET

(71) Applicant: ZENITH CO., LTD., Tokyo (JP)

(72) Inventor: Norimitsu Shimizu, Tokyo (JP)

( * ) Notice: Subject to any disclaimer, the term of this patent is extended or adjusted under 35 U.S.C. 154(b) by 78 days.

(21) Appl. No.: 16/497,451

(22) PCT Filed: Feb. 16, 2018

(86) PCT No.: PCT/JP2018/005471
§ 371 (c)(1),
(2) Date: Sep. 25, 2019

(87) PCT Pub. No.: WO2019/123668
PCT Pub. Date: Jun. 27, 2019

(65) Prior Publication Data
US 2021/0006540 A1    Jan. 7, 2021

(30) Foreign Application Priority Data
Dec. 21, 2017 (JP) .............................. JP2017-245637

(51) Int. Cl.
*H04L 9/40* (2022.01)
*H04L 67/02* (2022.01)
*H04L 67/01* (2022.01)

(52) U.S. Cl.
CPC ...... *H04L 63/0245* (2013.01); *H04L 63/0435* (2013.01); *H04L 63/0876* (2013.01); *H04L 63/20* (2013.01); *H04L 67/02* (2013.01); *H04L 67/42* (2013.01)

(58) Field of Classification Search
CPC ............ H04L 63/0245; H04L 63/0435; H04L 63/0876; H04L 63/20; H04L 67/02; H04L 67/42
See application file for complete search history.

(56) References Cited

U.S. PATENT DOCUMENTS

| | | | |
|---|---|---|---|
| 10,587,592 B2 * | 3/2020 | Koya | H04L 63/10 |
| 2003/0153815 A1 * | 8/2003 | Iwano | G16H 40/67 600/300 |
| 2016/0218915 A1 * | 7/2016 | Draper | H04L 41/04 |
| 2018/0324159 A1 * | 11/2018 | Koya | H04L 63/10 |

* cited by examiner

*Primary Examiner* — Arvin Eskandarnia

(57) ABSTRACT

[Issue] In the cloud server, data is distributed to multiple devices such as data storage devices, data processing devices, and communication devices. Therefore, in order to protect data from unauthorized access, security measures are applied to all of them, which need to be constantly updated. Moreover, this security management depends on the operators of the respective devices, and even if each operator completely performs, it is not possible to predict when a new attack method will be devised, leaving users with a constant data-leakage-related anxiety.
[Methods to solve the Issue] The present invention moves confidential data stored in a cloud server on the Internet to a data storage device of an intranet connected via a firewall, and links the ID of the confidential data and the confidential data. It is thus characterized by not placing confidential data on the internet. As a result, it is possible to narrow the measures for preventing unauthorized access to the firewall, the management becomes easy and the user can take the lead in management, so the user can use the cloud server with peace of mind.

5 Claims, 7 Drawing Sheets

SECURE CLOUD THAT DOES NOT PLACE CONFIDENTIAL DATA ON THE INTERNET

TECHNICAL FIELD

The present invention relates to a system using a cloud server, and is a way to protect confidential data from unauthorized access.

BACKGROUND OF THE TECHNIQUE

As the computerization of business becomes widespread and cost and convenience are required, systems using a cloud server that are easy to install and inexpensive, replacing the servers that until now were installed in the company intranet, are increasingly introduced.

However, because cloud servers place confidential data on the Internet, they have the disadvantage of a weak security against external unauthorized access.

So far, many researchers and developers have devised various security measures such as data encryption, division, or decentralization as a method of protecting data. However, as technology advances, it has become an arms race with those who try to gain unauthorized access, and even if a safe system is introduced, once the data is on the Internet, nobody knows when the data security measures of this system will be broken, thus being unable to eliminate the user's concern about cloud servers.

PRIOR TECHNICAL DOCUMENTS

Patent Document

JP-A-2017-27566
JP-A-2011-044167

Non-Patent Document

[Non-Patent Document 1] NISHIKAWA Ritsuko [Overview of secret sharing schemes] Oki Technical Review, January 2006/205, Vol. 73 No. 1

INVENTION SUMMARY

Issue that the Invention Seeks to Solve

In the cloud server, data is distributed to multiple devices such as data storage devices, data processing devices, and communication devices. Therefore, in order to protect data from unauthorized access, security measures are applied to all of them, which need to be constantly updated. Moreover, this security management depends on the operators of the respective devices, and even if each operator completely performs, it is not possible to predict when a new attack method will be devised, leaving users with a constant data-leakage-related anxiety.

Methods to Solve the Issue

The present invention prevents with a firewall unauthorized access from the outside, by moving confidential data stored on an internet cloud server to an intranet data storage device via a firewall.

Effect of the Invention

Compared with the situation where confidential data exists on the Internet, the present invention is advantageous in that security measures can be easily managed since unauthorized access from the outside can be prevented at one place of the firewall.

DESCRIPTION OF THE INVENTION

On the Internet, processing is performed using the ID of the confidential data instead of the confidential data itself, and the confidential data is stored in association with its ID in the data storage device of the intranet, so that when the ID is downloaded on the intranet and replaces the confidential data stored in the storage device, the same system operation as when there is the confidential data in the Internet can be performed. This replacement is performed by a data linkage device, and according to the present invention, by installing this device, it has been made possible to move the confidential data from the Internet to the intranet without impairing the functioning of the system.

Example 1

Figure 1:
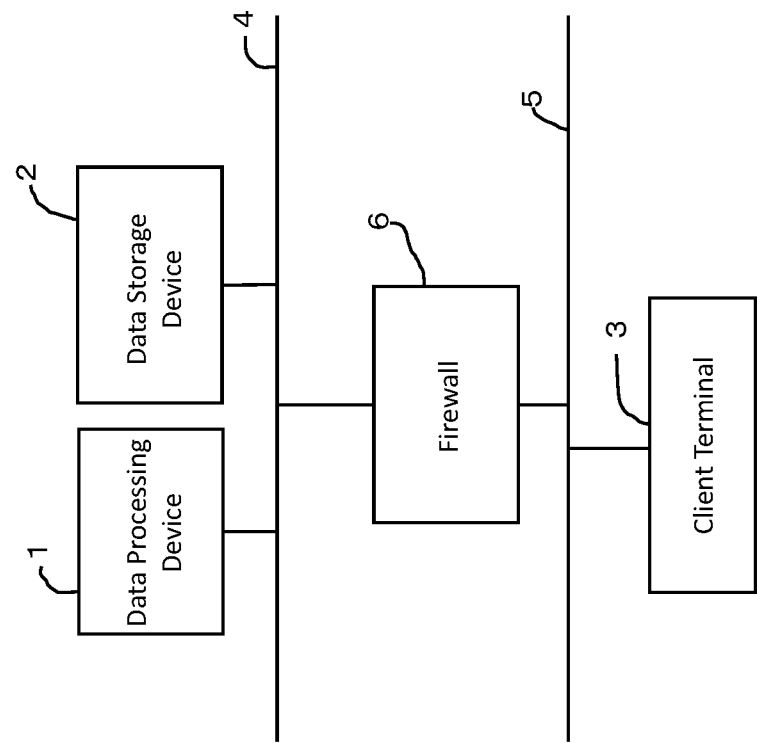
FIG. 1 is a layout diagram of a conventional example.
Figure 2:
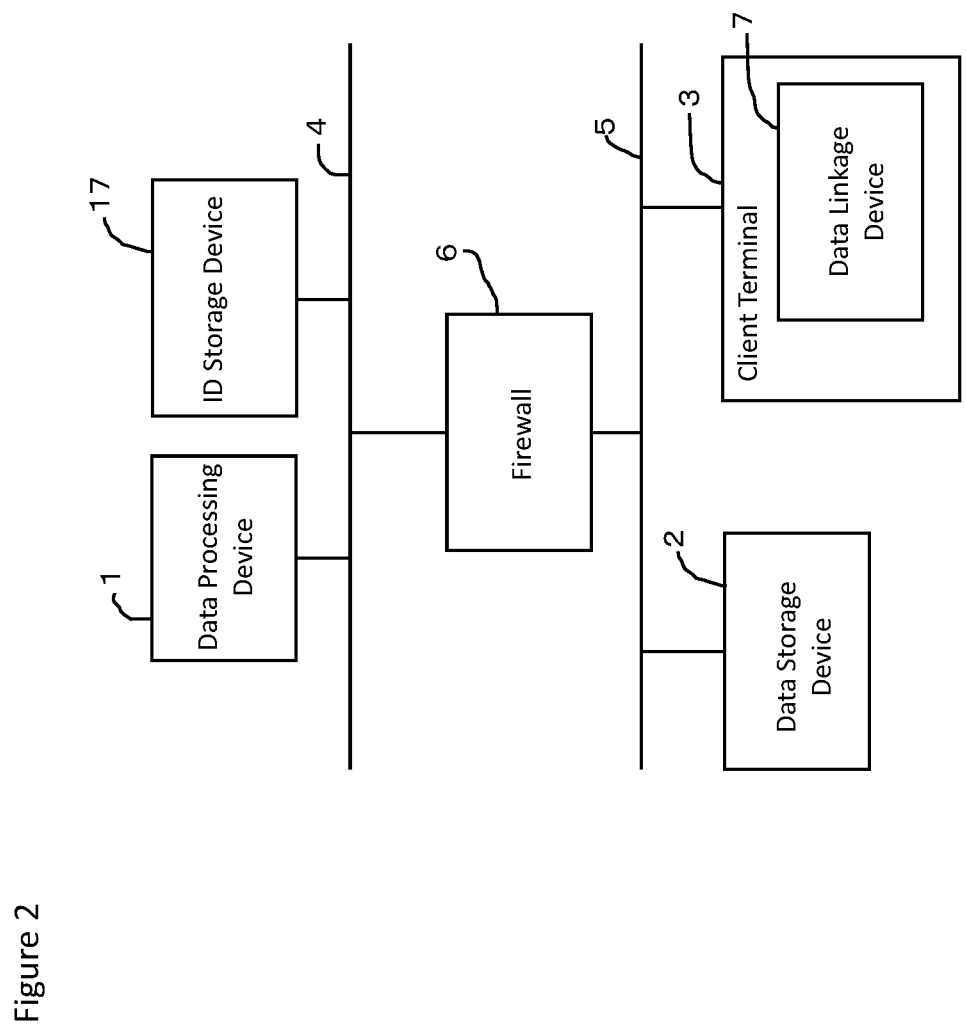
FIG. 2 is a layout diagram of the mounting method 1 of the present invention.

In FIG. 2, the data linkage device 7 of the client terminal 3 connected to the intranet 5 obtains an ID from the ID storage device 17, passes the ID to the data storage device 2, replaces it with the data obtained from data storage 2, and delivers it to the client terminal 3, which uses said data to function. The data linkage device 7 of the client terminal 3, following the instructions of the data processing device 1 written in the scriptfile in HTML and Javascript and downloaded from the data processing device 1, sends an XML HttpRequest for ID acquisition request to the data processing device 1, the data processing device 1 which has received it obtains an ID from the ID storage device 17 and sends it back to the data linkage device 7. Because at this time, the communication protocol is performed via the firewall 6, it is impossible to access from the Internet side, and communication is started from the data linkage device 7 of the intranet, but when security, operational stability and convenience are taken into consideration, HTTP or HTTPS is suitable.

Figure 4:
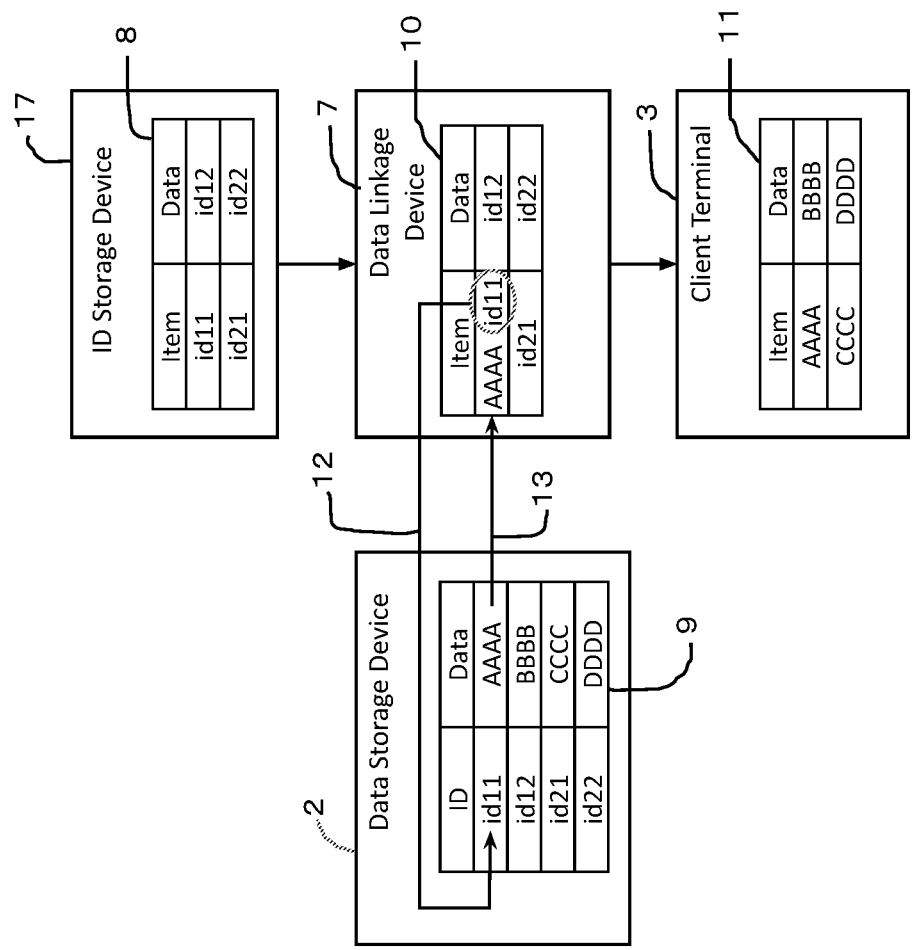
FIG. 4 is an explanatory diagram of the operation of the data linkage device 7 of FIG. 2 when there is data in the data storage device.

FIG. 4 is an explanatory diagram of the operation of the data linkage device 7 according to Example 1, and is an operation whereby data is stored in the data storage device 2 in association with an ID. The data linkage device 7 copies the ID array 8 of the ID storage device 17 to the working array 10, passes the ID (id 11) to the data storage device 2 as in operation 12, and the data storage device 2 data (AAAA) associated with the ID (id11) is returned as in operation 13, and when the data linkage device 7 receives the data (AAAA), the ID (id11) is replaced with the data (AAAA). This operation is performed for all IDs (id12, id21, id22). As a result, data (AAAA, BBBB, CCCC, DDDD) is stored in the working array 10, and when it is passed to Table 11, the data (AAAA, BBBB, CCCC, DDDD) is stored in, and sorted by, Table 11, so that client terminal 3 may function.

The ID needs to be a unique ID that does not overlap with the ID of other data at least in the system. If it is not unique, a plurality of data is associated with one ID, it cannot be determined which data is true, a malfunction such as displaying wrong data occurs, and the system cannot function properly. Also, the system considered in the present application can simultaneously use a plurality of groups, but in that case the uniqueness of the ID becomes a problem. As a countermeasure, the uniqueness of the ID can be secured by using either a fixed processing such as adding a character defined for each group to the data that is the source of the ID before converting it using a hash function, or by using a pointer, an address or an URL to designate a specific location defined for each group as an ID. Further, the data stored in association with the ID of the data stored in the data storage device 2 may not only be the data that is the source of the ID, but, for example, if the data that is the source of the ID is a student number, other related data other than the student number such as the name, date of birth, permanent domicile, etc., and may be plural.

Figure 5:
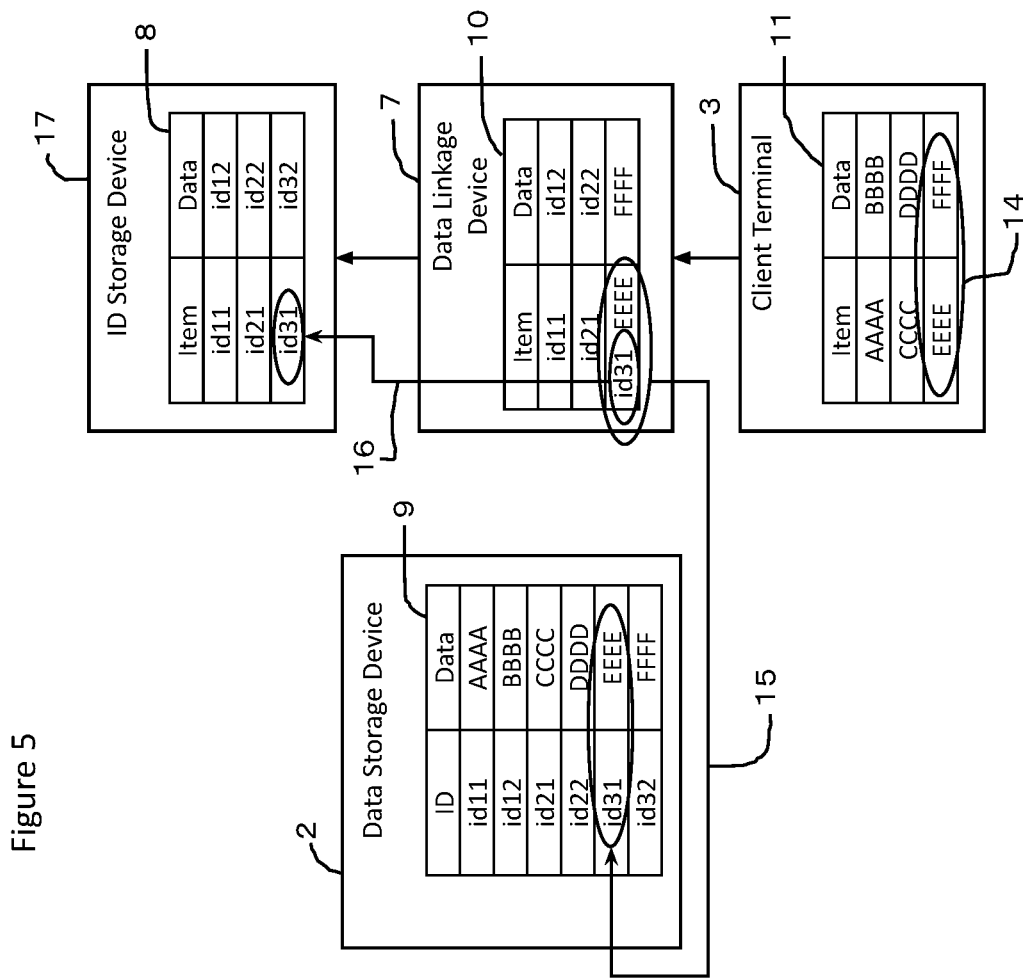
FIG. 5 is an explanatory diagram of the operation of the data linkage device 7 of FIG. 2 when new data is generated.

FIG. 5 is an explanatory diagram of the operation of the data linkage device 7 according to the Example 1, which is an operation whereby new data 14 is input to the client terminal 3. When data linkage device 7 converts the data 14 (EEEE) into a unique ID (id 31) associates it with data 14 (EEEE) and sends it to data storage device 2 as in operation 15, data storage device 2 stores it. Next, when the ID (id 31) is sent to the ID storage unit 17 like in operation 16, ID storage unit 17 stores the ID (id 31).

Since the data linkage device 7 operates as described in FIG. 4 and FIG. 5, the entire system functions as if the data is on the Internet, even if the data is not output on the Internet. Since all unauthorized access to data from the outside can be prevented by the firewall 6, if the firewall 6 is firmly managed, the data stored in the intranet is secure.

Example 2

Figure 3:
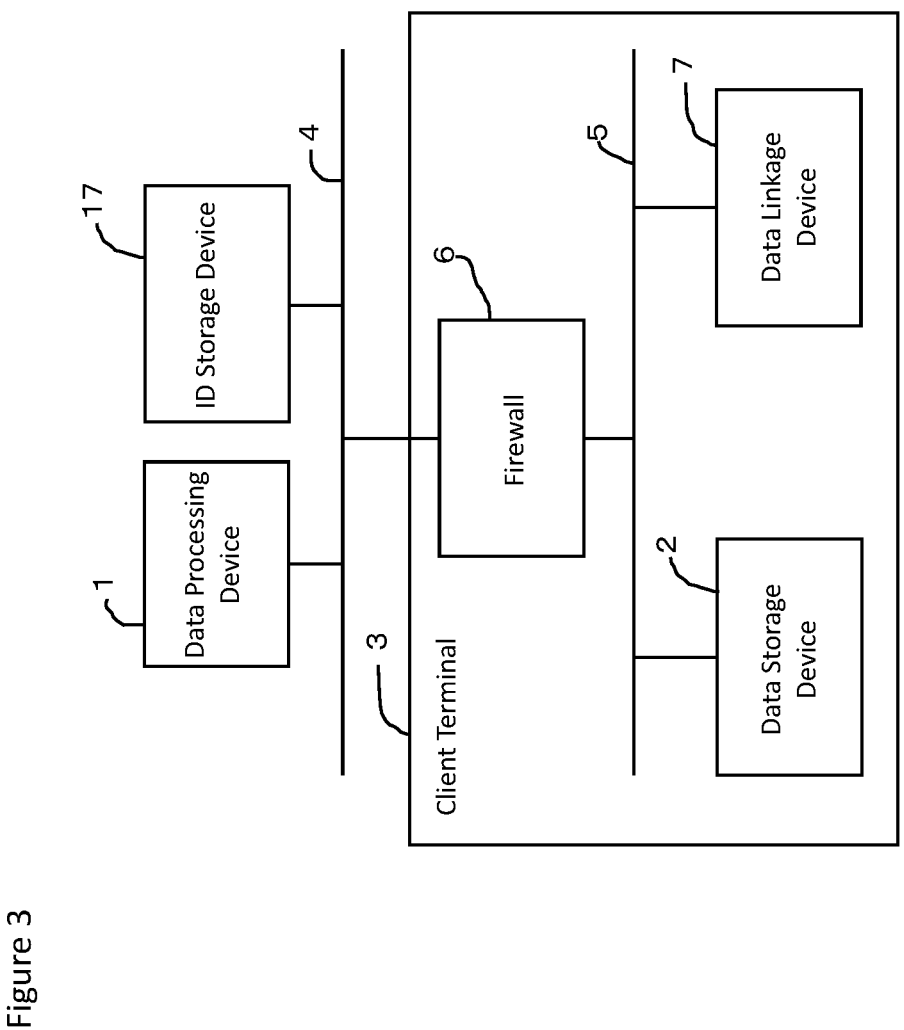
FIG. 3 is a layout diagram of the mounting method 2 of the present invention.

FIG. 3 shows the case where the firewall 6, the data storage device 2 and the data linkage device 7 are included in one client terminal 3. Basic operations and functions are the same as in Example 1.

INDUSTRIAL APPLICABILITY

Figure 6:
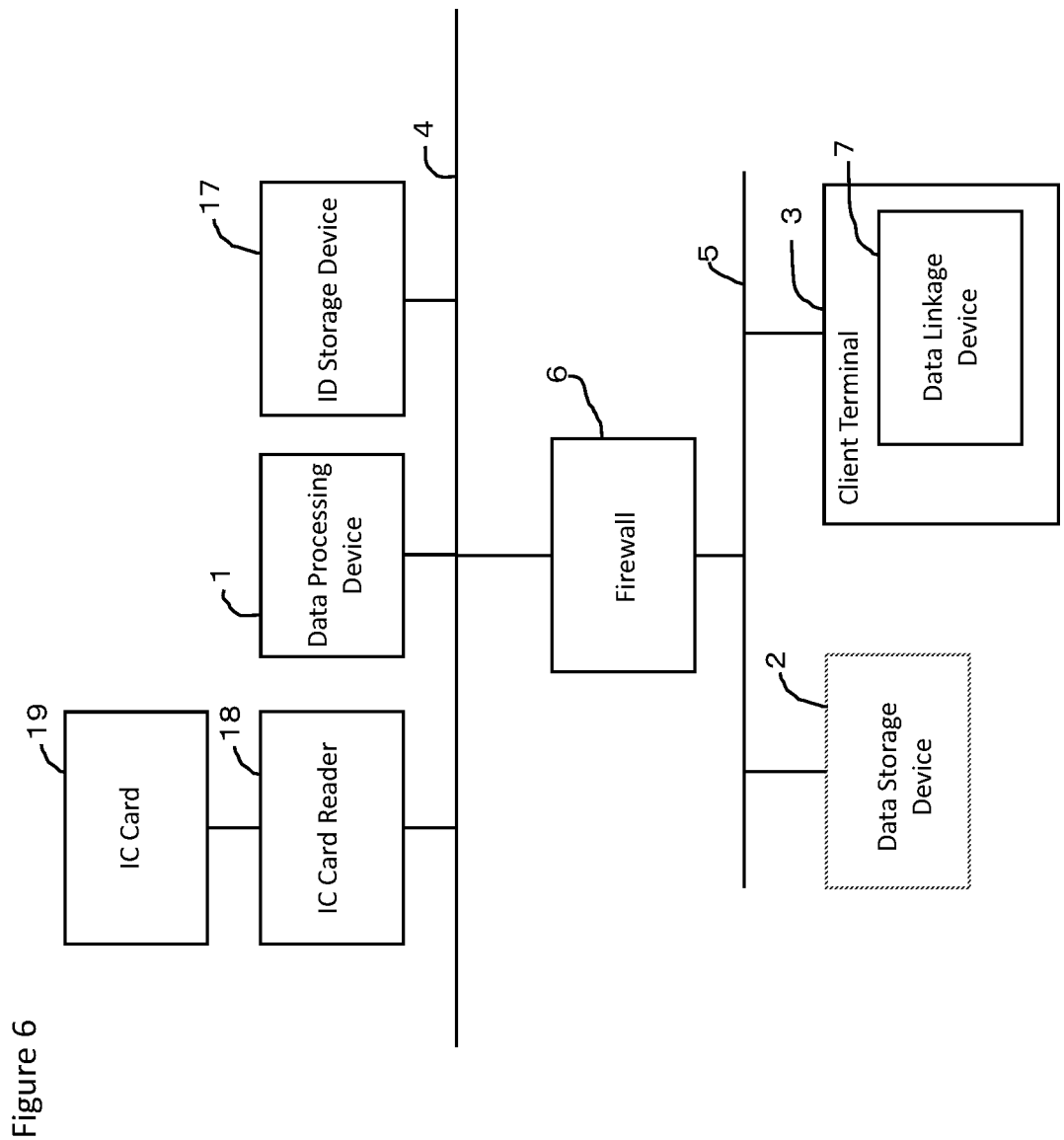
FIG. 6 is a layout diagram of an application example.
Figure 7:
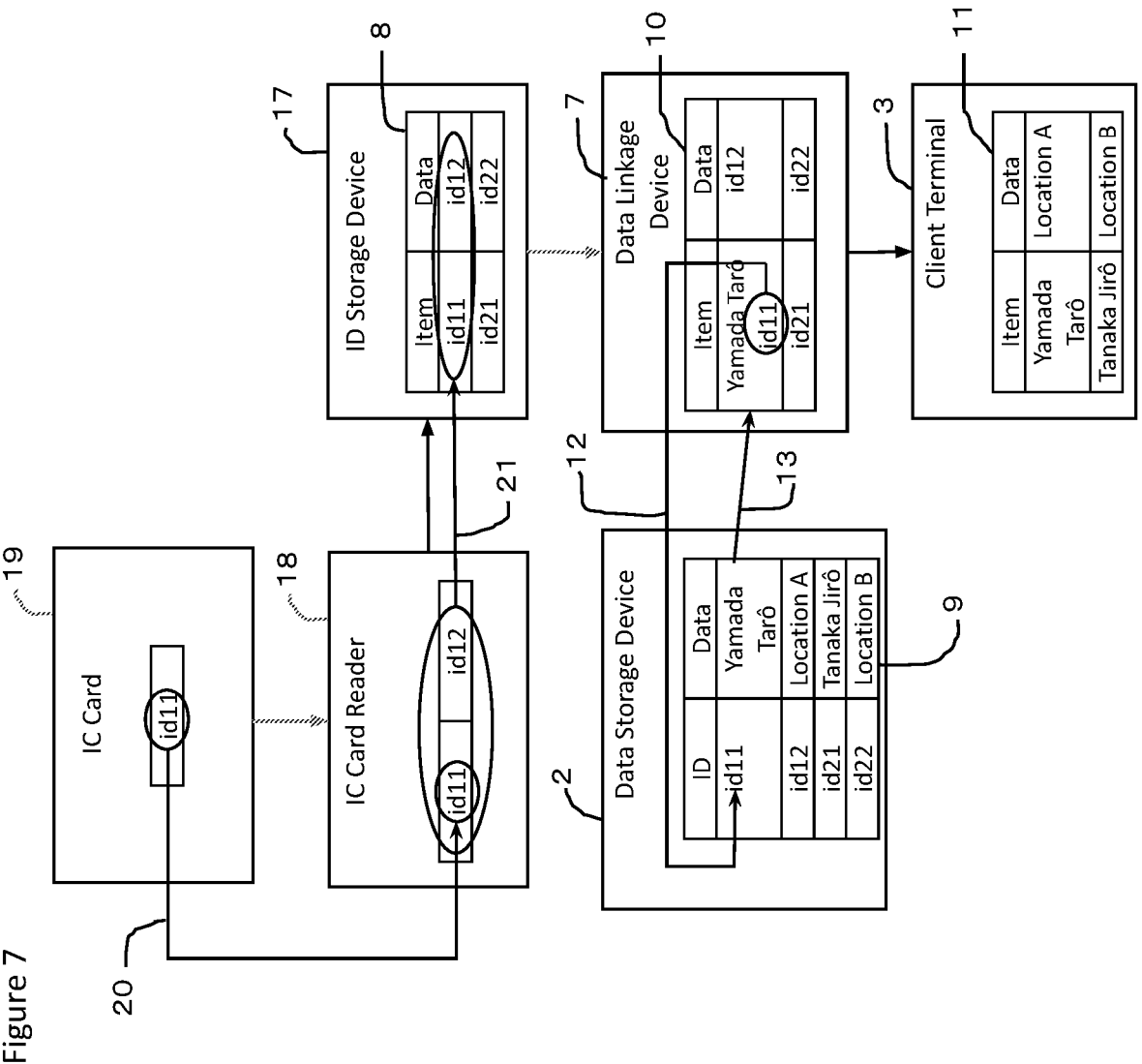
FIG. 7 is an explanatory diagram of the operation of an application example.

The present invention is suitable for a system that may function as originally intended even if it does not use the data itself but the ID of the data on the Internet, and even if the ID is replaced with the original data in the intranet. Confirmation of attendance for school classes is one example. When the IC card reader 18 connected to the Internet 4 in FIG. 6 is reported the attendance with the student IC card 19, the ID of the student IC card 19 is stored on the ID storage device 17 but there are no issue with performing these processes these with the ID. When the staff member of the Student Division confirms the attendance on the intranet, if the ID is rewritten to the data of the student information associated with the ID of the data storage device 2, the student's name, place and attendance can be confirmed. FIG. 7 shows the operation. The ID (id 11) written in the student IC card 19 is read in the IC card reader 18 as in operation 20, combined with the ID (id 12) representing the location previously written in the IC card reader 18, then stored in the ID storage device 17 as in operation 21, the name and the location are then displayed on the client terminal 3 by the operation described in FIG. 4. This allows the person in charge to know which student attended which class. As another use case, personal data in plain text can be handled in the same manner, so it is effective even in a social security number management system or the like in which it is desirable to keep personal data confidential, although certain parts of the text are not confidential. In this case, personal data are protected because names and social security numbers in plain text on the Internet are rewritten to IDs, but this personal data is associated with the IDs and stored in the intranet data storage device. If you read the text on the intranet, the name and social security number in the text can be rewritten instead of the ID, so the text becomes a complete text with the name and social security number inserted.

EXPLANATION OF SIGNS

1 Data Processing Device
2 Data Storage Device
3 Client Terminal
4 Internet
5 Intranet
6 Firewall
7 Data Linkage Device
8 Array of IDs stored in the ID Storage Device
9 ID stored in the Data Storage Device and Data Array
10 Working Array used on the Data Linkage Device
11 Table where Data is written used by the Client Terminal
12 Operation of passing item no 10 ID (id 11) to item no 9 and extracting data (AAAA)
13 Operation of rewriting the extracted data (AAAA) instead of the item no 10 ID (id 11)
14 Data newly added to item no 11 (EEEE, FFFF)
15 Operation of storing in item no 9 ID (id 31) obtainable from data newly added to item no 10 (EEEE) and data (EEEE)
16 Operation of storing item no 10 ID (id 31) in ID Array 8
17 ID Storage Device
18 IC Card Reader
19 IC Student Card
20 Operation of the IC Card Reader 18 reading ID (id 11) written on IC Student Card 19
21 Operation of adding the ID (id 11) read from the IC Student Card 19 and the ID (id 12) representing a location previously written on the IC Card Reader 18 and storing in the ID Storage Device 17

The invention claimed is:

1. A system whereby, in a system having multiple networks, a data processing device, an ID storage device, a data storage device, a client terminal, a firewall, and a data linkage device, the data processing device and the ID storage device are connected to one network, and the data storage device, the client terminal, and the data linkage device are connected to another network via a firewall that can be set so that unauthorized access may not be made from the first network. The data processing device operates the ID storage device and the data linkage device, the data storage device associates the data with the data ID and stores it, the ID storage device stores the data ID, the data linkage device obtains the ID from the ID storage device, then based on the ID the data linkage device obtains the data associated with the ID from the data storage device, allowing the client terminal to function.

2. The system described in claim 1 comprises the following: an ID storage device which has the function of storing at least one of an array, a table, a database, or a sentence in a state where at least a part of the data is substituted with the ID of the data, a data storage device which has the function of storing the data and the ID of the data which are associated each other, and a data linkage device which has the function of passing the ID to the data storage device and obtaining the related data, or of generating the ID of the data, of associating it with the data and passing at least one of those to the data storage device.

3. The system described in claim 1 or claim 2 is characterized in that the ID is a unique ID that does not overlap with the ID of other data at least in the system, and the data is either unprocessed original data, encrypted data, or a value or a code associated with the data.

4. The system described in claim 1 or claim 2 is characterized in that the communication protocol performed via the firewall is HTTP or HTTPS.

5. The system described in claim 3 is characterized in that the ID is either a value or a code generated by a method generating a hash function or a unique code after direct or constant processing of the original data, or a pointer or an address or a URL pointing to the storage location of the data.

* * * * *